Jan. 10, 1950     R. C. PERSONS     2,494,519

SADDLE PROTECTOR

Filed July 8, 1948

INVENTOR.
Robert C. Persons
BY

Patented Jan. 10, 1950

2,494,519

UNITED STATES PATENT OFFICE 2,494,519

SADDLE PROTECTOR

Robert C. Persons, Worcester, Mass., assignor to Persons-Majestic Mfg. Co., Worcester, Mass., a corporation of Massachusetts Application July 8, 1948, Serial No. 37,726

4 Claims. (Cl. 155—5.10)

This invention relates to saddles for bicycles, tricycles, motorcycles and other wheeled vehicles, which for convenience will be simply referred to as "saddles" hereinafter.

The principal object of the invention is to provide for a saddle a protective device or bumper which can be manufactured cheaply, assembled to the saddle readily and provide a degree of protection to the saddle heretofore unknown.

A further object of this invention is to provide a hanger on the saddle for such accessories as tool bags, reflectors, and the like, such hanger, bumper, etc., being provided mainly at the rear of the saddle, and extending around to the side edges at the widest part thereof only.

When the invention is attached to a saddle it may be used also as a handle when lifting the vehicle, thereby keeping the saddle free from grease, dirt or other contamination.

Other objects and advantages of the invention will appear hereinafter.

Reference is to be had to the accompanying drawings in which

Figure 1:
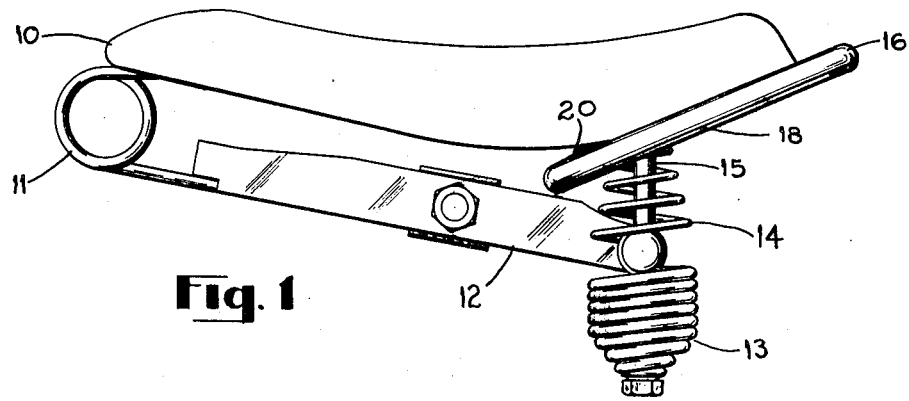
Fig. 1 is a view in side elevation of a saddle incorporating my invention.

A complete saddle is shown for purposes of illustration and, as is customary, is provided with a top 10, front spring 11, frame 12, lower and upper rear springs 13 and 14, and bridge 15 holding the springs. The new saddle protector is generally indicated at 16, and as clearly illustrated in Figs. 1 and 2, this protector follows the contour of the rear portions of the saddle top 10, jutting beyond the saddle top at its rear and laterally at the widest points as at 18, then having a reverse curve 20, extending under the saddle top 10. Means are provided for attaching the saddle protector to the bottom of the saddle by eyeing the free ends of the reverse curves 20, as at 22.

The saddle protector at the rear edge of the saddle is spaced therefrom and can be used as a handle or for a hanger for reflectors, accessories, etc.; and from the rear edge the protector extends forwardly and down as well as out at 18. The reverse curves 20 extend slightly up as well as inwardly, and thus provide for securement to the underside of the saddle.

Figure 2:
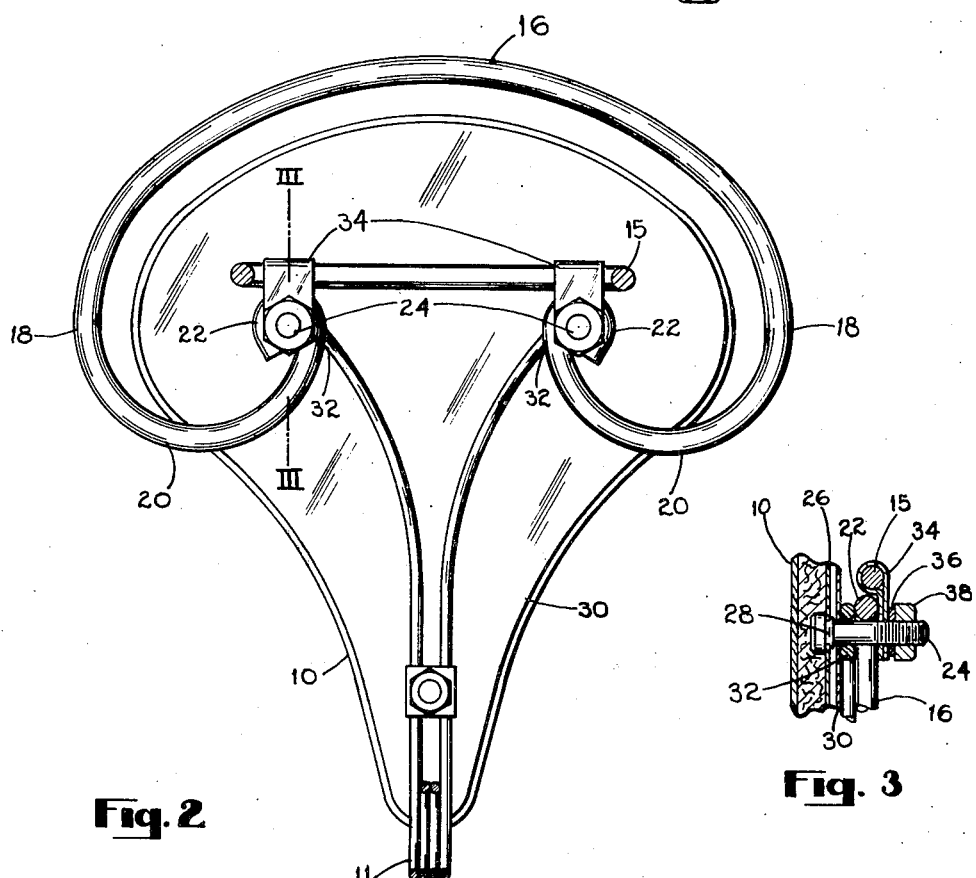
Fig. 2 is a bottom plan view, parts being in section.

It can be clearly seen in Fig. 2 that the portion 18 of the protective bumper provides lateral protection to the saddle 10, and in the event of a spill the bumper 16 will take the full shock of the fall thereby preventing the covering of the saddle top 10 from becoming scratched or torn.

Figure 3:
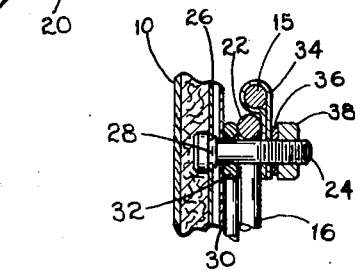
Fig. 3 is a sectional view taken on line 3—3 of Fig. 2.

In attaching the protector 16 to the saddle top 10, the eyed ends 22 of the protector are passed over bolts 24. By referring to Fig. 3 this method of assembly can be more readily understood. The heads of bolts 24 are riveted securely to the inner saddle plate 26, as at 28. In assembly, after the top is provided with the bolts 24, protruding through the outer saddle plate 30, the various parts are assembled in the following order: first the eyed ends 32 of the front spring 11 are passed over the bolts 24, after which the eye 22, of the bumper 16, is placed over the bolt, and on top is placed the usual clip 34, which is in turn attached to the bridge 15, then the whole is permanently and securely fastened together by use of a lockwasher 36, and a nut 38.

The protector 16 having been bent to the desired shape in the first place, will retain the position shown for the purpose described, even though fastened only at its ends.

Having thus described my invention and the advantages thereof, I do not wish to be limited to the details herein disclosed otherwise than as set forth in the claims, but what I claim is:

1. For use with a spring supported saddle for bicycles or the like having a pair of downwardly projecting spring attaching bolts at the rear portion thereof, a bumper for said saddle comprising a wire shaped to conform to the general contour of the saddle seat but spaced therefrom at the sides and rear, said bumper being downwardly and forwardly inclined at the sides thereof and having reversely curved inwardly and upwardly extending portions beneath the saddle secured at their ends to said spring attaching bolts.

2. For use with a saddle for bicycles or the like having a pair of downwardly projecting bolts at the rear portion thereof, a front spring unit including a coil spring secured to the front of the saddle and having rearwardly projecting branches connected at their ends to said bolts, a rear spring unit for the saddle including a spring carrying bridge having its ends also connected to said bolts; a bumper for said saddle comprising a wire shaped to conform to the general contour of the saddle seat but spaced therefrom at the sides and rear, said bumper being downwardly and forwardly inclined at the sides thereof and having reversely curved portions extending inwardly and upwardly beneath the saddle and secured at their ends to said bolts between the points of attachment on the bolts of the front and rear spring units.

3. A bumper adapted for attachment to a bicycle saddle or the like, said bumper comprising a wire shaped to conform to the general contour of the rear of the saddle seat, the sides of the bumper being downwardly and forwardly inclined, and having reversely curved inwardly and upwardly inclined portions adapted to be secured at their ends beneath the saddle seat.

4. For use with a spring supported saddle for bicycles or the like having a pair of downwardly projecting spring attaching bolts at the rear portion thereof, a bumper for said saddle comprising a wire shaped to conform to the general countour of the saddle seat but spaced therefrom at the sides and rear, said bumper being downwardly bent at the forward part thereof at the sides thereof and having reversely curved upwardly and inwardly extending portions beneath the saddle secured at their ends to said spring attaching bolts.

ROBERT C. PERSONS.

REFERENCES CITED

The following references are of record in the file of this patent:

UNITED STATES PATENTS

| Number | Name | Date |
|---|---|---|
| 2,433,686 | Dupont | Dec. 30, 1947 |

FOREIGN PATENTS

| Number | Country | Date |
|---|---|---|
| 373,211 | Italy | July 21, 1939 |